United States Patent Office 3,115,485
Patented Dec. 24, 1963

3,115,485
PROCESS FOR THE MANUFACTURE OF COPOLYMERS
Herbert Bartl and Wilhelm Becker, Cologne-Stammheim, Germany, assignors to Farbenfabriken Bayer Aktiengesellschaft, Leverkusen, Germany, a corporation of Germany
No Drawing. Filed Aug. 15, 1961, Ser. No. 131,465
Claims priority, application Germany Sept. 29, 1960
3 Claims. (Cl. 260—87.3)

The present invention relates to copolymers of ethylene with vinylesters as well as process for production of these copolymers.

When ethylene and vinyl esters such as vinylacetate or vinyl propionate are polymerized in tert.-butanol, for example by the process disclosed in French patent specification 1,189,387 or in a mixture which contains predominantly tert.-butanol in addition to water, copolymers having properties of great practical interest are obtained. Thus, for example, copolymers into which 5–35% of vinyl esters have been polymerized are suitable for the manufacture of shrinkage-foils free from plasticizers, whereas copolymers containing a higher percentage, for example copolymers containing up to about 50% vinyl acetate, may be converted by peroxidic cross-linkage into rubber-like products which are distinguished in particular by their resistance to aging and to ozone. In the abovementioned copolymerization process, particularly when it is carried out continuously, swelling particles are readily formed, which impair the quality of the article made from the polymer, and in the course of continuous polymerization these particles tend to form deposits in the reaction vessel.

The copolymers which are of technical interest, for instance those suitable for shrinkage foils, which contain 5–35% vinyl acetate, preferably 10–20% vinyl acetate, are insoluble at room temperature in the tert.-butanol used as reaction medium, whereas at about 60° C. the copolymers containing more than 25% vinyl acetate are soluble, and therefore at that temperature they may be produced by solution polymerization. The copolymers incorporating less than 25% vinyl acetate are still insoluble at that temperature, and have to be produced by a precipitation polymerization process under very much less favourable conditions and with greater expense.

It has now been found that when copolymerizing ethylene with vinyl esters, preferably vinyl acetate and vinylpropionate in the presence of large quantities of tert.-butanol, the formation of swelling particles may be practically completely prevented, and that copolymers with a lower content of vinyl ester may be prepared free from swelling particles by a solution polymerization if the copolymerization is carried out in solvent mixtures consisting on the one hand of tert.-butanol and on the other hand of 5–45% of branched aliphatic saturated hydrocarbons which contain 4–10 carbon atoms and not more than one

or —CH$_2$— group, or esters of monohydric saturated aliphatic alcohols containing 4–10 carbon atoms and saturated aliphatic monocarboxylic acids likewise containing 4–10 carbon atoms, in which at least one of the ester components, i.e. either the alcohol or the acid or both contain not more than one

or —CH$_2$— group.

In the groups

and —CH$_2$— mentioned before the free carbon valences are intended normally to indicate a saturated carbon to carbon bond. Furthermore, in the case of an ester it is possible (not necessary) that one of said free valences indicates a bond between carbon and —O—.

Hydrocarbons suitable for carrying out the present invention are for example: isobutane, isooctane, tetramethylmethane, hexamethylethane, 2,2,4,4-tetramethylpentane, neohexane (=1,1,1-trimethylpropane) and 2,2,3-trimethylbutane.

Aliphatic esters as defined above include for example: trimethylacetic acid tert.-butyl ester, isovaleric acid tert.-butyl ester and trimethylacetic acid isononylester.

According to a particularly preferred embodiment of the present invention, solvent mixtures of tert.-butanol and isooctane are used.

The amount of solvent components used in combination with tert.-butanol should be sufficient to produce solubility of the copolymers in the solvent mixture with tert.-butanol, in order to reduce the yield and the mechanical properties of copolymerization as little as possible. The solvent mixtures of tert.-butanol and the above-mentioned hydrocarbons or esters therefor contain 5–45% of the said mixing components. One may, of course, also use mixtures of the abovementioned hydrocarbons or esters in combination with tert.-butanol.

The proportion of monomers on the one hand and solvent mixture on the other hand normally is such one, that per each 10 parts by weight of vinylester at least 2 parts by weight and not more than 100 parts by weight of solvent mixture are present.

The quantity of isooctane to be used according to the preferred embodiment of the present invention, or the proportion of the isooctane to tert.-butanol depends on the amount of vinylacetate in the ethylene-vinylacetate-copolymer and the desired polymerization temperature. In order to keep copolymers with 15–25% vinyl acetate in solution at 60–75° C., mixtures of isooctane and tert.-butanol must be used in proportions of 30:70 to 45:55 parts by weight. At temperatures above 100° C., less isooctane is sufficient to produce a liquid polymer phase.

Copolymerization by the present process, i.e. copolymerization of ethylene with vinyl esters, in particular vinyl acetate and/or vinylpropionate, is carried out in known manner. Copolymers having incorporated by copolymerization vinyl ester in amount of from 5 up to about 50% by weight are of a preferred interest; in the case of shrinkage-foils vinyl ester contents of the copolymer of between 5 and 35% by weight.

This copolymerization may be carried out at pressure above 10 atmospheres' excess pressure, preferably 200–700 atmospheres' excess pressure. The reaction temperatures should lie between 10 and 200° C., preferably 30–150° C.

Organic free-radical forming compounds are used as polymerization initiators, for example acylperoxides, such as acetyl peroxide, benzoyl peroxide, lauryl peroxide, and dichlorobenzoyl peroxide; or peroxydicarbonates such as diisopropyl-peroxydicarbonate, di-tert.-butylperoxy-dicarbonate; or radical-forming nitrogen compounds, such as α,α'-azodiisobutyric acid dinitrile. These initiators are used in the usual quantities, i.e. about 0.05 and 1% calculated on the monomers.

The copolymers are soluble in mixtures of lower aliphatic alcohols, such as methanol, ethanol, propanol, butanol with aromatic and/or chlorinated hydrocarbons as for instance benzene, toluene, trichloroethylene, carbontetrachloride, ethylenechloride, the alcohols being preferably used in amounts of about 5–50 percent by weight as calculated on the total weight of solvents.

The copolymers prepared according to the procedure of the present invention are suitable for production of wide variety of shaped articles. Copolymers having a vinylester content of about 50 percent by weight and more may be converted into valuable elastomers by peroxidic cross-linkage.

Ethylene-vinylester copolymers having a vinylester content of from 5 to 35% advantageously may be used for preparation of foils, especially shrinkage-foils.

The foils are preferably prepared with a thickness of about 0.02 to 0.5 mm. The foils may be stretched by processes known per se, longitudinally but preferably both longitudinally and transversely of the direction of flow for about 50 to 300 percent (that is to say a foil of 100 cm. length is stretched to 150 to 400 cm.). It is not necessary to heat when stretching the extruded foils. The stretched foils prepared from the polymers which have been described are completely transparent and have dimensional stability, i.e. they show no shrinkage at room temperature. But they shrink readily when they are heated to temperatures of 50 to 100° C., for instance when dipping the stretched foils into hot water. The amount of shrinkage obtained with the stretched foils is about 20 to 100 percent. In view of this shrinkage capacity and in view of the absence of any plasticizers the stretched foils are well suited as shrinkage foils for wrapping foodstuffs such as cheese, poultry, meat.

*Example 1*

13,000 cm.³ tert.-butanol and 1200 cm.³ vinylacetate in which 10 g. α,α-azodiisobutyric acid nitrile are dissolved are placed in an autoclave of 30 litres' capacity after removing atmospheric oxygen from the autoclave by washing with ethylene. Ethylene is then added at a pressure of 100 atmosphere above atmospheric pressure into the autoclave, the temperature of the contents is raised to 68° C., and more ethylene is added until an excess pressure of 300 atmospheres is reached. As soon as the ethylene pressure begins to fall, the ethylene pressure is maintained at 300 atmospheres by adding more ethylene under pressure during polymerization. Polymerization is interrupted after 18 hours. 2900 g. of a pulverulent polymer with a vinyl content of 19% are produced. The ($\eta$) value of the polymer is 0.82, the strength is 122 kg./cm.² at 600% elongation. Foils made from the copolymer contain a large number of swelling particles.

If the process is now repeated, but using a mixture of 8000 cm.³ tert.-butanol and 5000 cm.³ isooctane instead of 13,000 cm.³ tert.-butanol, 1900 g. of a product is obtained which has a ($\eta$) value of 0.78, a strength of 110 kg. at an elongation of 600%. Foils from this copolymer contain no swelling particles. Under polymerization conditions, the copolymer is present in the form of a solution, which facilitates carrying out the process continuously, because there is no deposition of pulverulent polymer which would favour the formation of swelling particles.

*Example 2*

In a mixture of 7000 cm.³ tert.-butanol, 6000 cm.³ tetramethylmethane and 1200 cm.³ vinylacetate 10 g. of diisopropylperoxydicarbonate are dissolved and the mixture is placed in an autoclave of 30 litres' capacity after removing atmospheric oxygen from the autoclave by washing with ethylene. Ethylene is then added at a pressure of 100 atmosphere above atmospheric pressure into the autoclave, the temperature of the contents is raised to 68° C., and more ethylene is added until an excess pressure of 300 atmospheres is reached. As soon as the ethylene pressure begins to fall, the ethylene pressure is maintained at 300 atmospheres by adding more ethylene under pressure during polymerization. Polymerization is interrupted after 18 hours. 2300 g. of a pulverulent ethylene-vinylacetate polymer are produced. The copolymer is particularly suitable for production of shrinkage foils.

*Example 3*

60 g. of lauroylperoxide are added to a mixture of 60 kg. of tert.-butanol, 8.8 kg. of trimethyl-acetic acid tert.-butylester and 15.7 kg. of vinylacetate. The mixture is placed in a 200-litre reactor after removing oxygen from the reaction-vessel by ethylene. During the copolymerization in a manner similar to that described in Example 1 an ethylene pressure of 350 atmospheres and a polymerization temperature of 69° C. are maintained.

30.5 kg. of a polymeric material with a vinylacetate content of 29% by weight are obtained. The product shows a strength of 174 kg./cm.² at an elongation of 646%.

*Example 4*

A mixture of 18 kg. of vinylacetate, 16.3 kg. of isooctane, 62.5 kg. of tert.-butanol and 0.4 kg. of α,α'-azodiisobutyric acid dinitrile is pumped into a reaction vessel in an amount of 30 litres per 1 hour together with 13 kg. of ethylene. A reaction temperature of 68–70° C. and an ethylene pressure of 350 atmospheres is maintained.

A polymerization unit of this type was in operation over a period of 30 days without disturbance caused by polymer separations. The copolymer obtained has a vinyl acetate content of 30% by weight and shows a strength of 200 kg./cm.² at an elongation of 700%. The product is suitable for shrinkage foils.

What we claim is:

1. In a process for the copolymerization of ethylene and a vinyl ester selected from the group consisting of vinyl acetate and vinyl propionate in the presence of a free radical-forming catalyst in a liquid phase containing tertiary butanol, the improvement which comprises conducting said copolymreization at temperatures of between 200 and 700 atmospheres and a temperature of between 10° and 200° C. in the presence of an organic liquid phase which contains, in addition to tertiary butanol, a special organic liquid selected from the group consisting of an aliphatic saturated hydrocarbon of 4 to 10 carbon atoms having not more than one

group, an aliphatic saturated hydrocarbon of 4 to 10 carbon atoms having not more than one —CH$_2$— group, an ester of a monohydric saturated aliphatic alcohol and a saturated aliphatic monocarboxylic acid both containing 4 to 10 carbon atoms and at least one of these ester components having not more than one

group, and an ester of a monohydric saturated aliphatic alcohol and a saturated aliphatic monocarboxylic acid both containing 4 to 10 carbon atoms and at least one of these ester components having not more than one —CH$_2$— group, said special organic liquid being present in said liquid phase in quantities of from 5 to 45% by weight of the solvent mixture used.

2. Process of claim 1 wherein said additional organic liquid is isooctane.

3. Process of claim 1 wherein a solvent mixture of isooctane and tertiary butanol is used in a ratio of from 30:70 to 45:55.

References Cited in the file of this patent

UNITED STATES PATENTS

| | | |
|---|---|---|
| 2,703,794 | Roedel | Mar. 8, 1955 |
| 2,947,735 | Bartl | Aug. 2, 1960 |
| 2,952,636 | Groot et al. | Sept. 13, 1960 |